(12) United States Patent
Sakamoto et al.

(10) Patent No.: US 8,983,217 B2
(45) Date of Patent: Mar. 17, 2015

(54) STEREO IMAGE ENCODING APPARATUS, ITS METHOD, AND IMAGE PICKUP APPARATUS HAVING STEREO IMAGE ENCODING APPARATUS

(75) Inventors: Daisuke Sakamoto, Yokohama (JP); Jun Otsuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 13/456,798

(22) Filed: Apr. 26, 2012

(65) Prior Publication Data

US 2012/0294546 A1 Nov. 22, 2012

(30) Foreign Application Priority Data

May 17, 2011 (JP) .................................. 2011-110378
Mar. 8, 2012 (JP) .................................. 2012-051386

(51) Int. Cl.
*G06K 9/38* (2006.01)
*H04N 13/00* (2006.01)
*H04N 19/597* (2014.01)
*H04N 19/56* (2014.01)
*H04N 19/57* (2014.01)
*H04N 19/61* (2014.01)

(52) U.S. Cl.
CPC ......... *H04N 13/0048* (2013.01); *H04N 19/597* (2014.11); *H04N 19/56* (2014.11); *H04N 19/57* (2014.11); *H04N 2013/0081* (2013.01); *H04N 19/61* (2014.11)
USPC ........... 382/238; 382/233; 382/246; 382/236; 378/240.12; 378/240.15

(58) Field of Classification Search
CPC .......... H04N 13/0048; H04N 19/0066; H04N 19/00678; H04N 19/00769; H04N 19/00781; H04N 2013/0081

USPC ............ 382/233, 246, 236, 238; 375/240.12, 375/240, 240.15, 506, 240.16, 240.18, 375/240.08

See application file for complete search history.

(56) References Cited

U.S. PATENT DOCUMENTS 6,043,838 A * 3/2000 Chen ............................... 348/42
6,430,224 B1 * 8/2002 Naito et al. ............... 375/240.16

(Continued)

FOREIGN PATENT DOCUMENTS

CN       1976476 A     6/2007
CN    101207810 A     6/2008

(Continued)

OTHER PUBLICATIONS

The above references were cited in a Apr. 18, 2013 Japanese Office Action, which is not enclosed, that issued in Japanese Patent Application No. 2012-051386.

(Continued)

*Primary Examiner* — Mekonen Bekele
(74) *Attorney, Agent, or Firm* — Cowan, Liebowitz & Latman, P.C.

(57) ABSTRACT

When a plurality of image signals of an object picked up by a plurality of image pickup units are encoded on a predetermined pixel block basis by using an inter-prediction between images, difference information showing an offset between the images is generated from the plurality of image signals, and a search range which is set in order to detect a vector on the predetermined pixel block basis is adaptively set in accordance with the generated difference information.

5 Claims, 11 Drawing Sheets

(56) References Cited

U.S. PATENT DOCUMENTS

| | | | |
|---|---|---|---|
| 8,427,488 B2* | 4/2013 | Hirai et al. | 345/506 |
| 2007/0147502 A1* | 6/2007 | Nakamura | 375/240.12 |
| 2009/0028248 A1* | 1/2009 | Kitahara et al. | 375/240.26 |
| 2009/0254572 A1* | 10/2009 | Redlich et al. | 707/10 |
| 2009/0285302 A1* | 11/2009 | Kato et al. | 375/240.16 |
| 2010/0002764 A1* | 1/2010 | Lie et al. | 375/240.08 |
| 2010/0289882 A1* | 11/2010 | Ohta | 348/51 |
| 2011/0122234 A1* | 5/2011 | Kikkawa | 348/51 |
| 2012/0162223 A1* | 6/2012 | Hirai et al. | 345/419 |
| 2013/0076873 A1* | 3/2013 | Oshikiri | 348/51 |
| 2013/0088570 A1* | 4/2013 | Takahashi et al. | 348/43 |
| 2013/0114689 A1* | 5/2013 | Chang | 375/240.03 |

FOREIGN PATENT DOCUMENTS

| | | |
|---|---|---|
| CN | 101415122 A | 4/2009 |
| CN | 101540926 A | 9/2009 |
| JP | 09-261653 A | 10/1997 |
| JP | 2000-165909 | 6/2000 |
| JP | 2004-221757 A | 8/2004 |
| JP | 2008-167267 A | 7/2008 |

OTHER PUBLICATIONS

The above foreign patent documents were cited in a Mar. 7, 2014 Chinese Office Action, which is enclosed with an English Translation, that issued in Chinese Patent Application No. 201210154872.4.

* cited by examiner

STEREO IMAGE ENCODING APPARATUS, ITS METHOD, AND IMAGE PICKUP APPARATUS HAVING STEREO IMAGE ENCODING APPARATUS

BACKGROUND OF THE INVENTION

1. Field of the Invention

The present invention relates to an encoding apparatus for encoding an image and, more particularly, to a stereo image encoding apparatus for encoding a stereo image which is formed by using a plurality of images picked up by a plurality of image pickup units.

2. Description of the Related Art

In recent years, in association with a spread of a display which can display a stereo image, an attention has also been paid to an image pickup apparatus which can photograph a stereo image. The stereo image is generally formed by using a right image and a left image which were respectively photographed by two cameras having a parallax. As a technique for encoding an image, a compression encoding/decoding technique using a motion prediction which searches for a motion vector between images in a time base direction in such a manner that is used in an MPEG method and the like has been known in the related art. In addition to such a technique, an encoding method using a parallax prediction which searches for a vector due to a parallax between a right camera and a left camera (hereinbelow, referred to as a parallax vector) has also been known (refer to the Official Gazette of Japanese Patent Application Laid-Open No. 2000-165909).

Japanese Patent Application Laid-Open No. 2000-165909 discloses an encoding apparatus in which, for example, a stereo image photographed by two cameras disposed in parallel is compression-encoded by using a parallax prediction. Particularly, it discloses such a technique that on the basis of such a parallax between the cameras that an object image is picked up by the left camera is picked up by the right camera at a position certainly having an offset in the left direction, a search range of the parallax prediction to an image picked up by the right camera is set to the position having an offset in the left direction.

In the related art, in the case of a stereo-encoding for providing a depth in an image, in consideration of an offset based on such a parallax that an object in an image viewed by the left eye has certainly an offset in the left direction in the right eye, for example, such a technique that a search range of the parallax prediction is set to the position having an offset in the left direction from the same position as that of the object in the image on a display screen or the like is used.

However, in the related art, although the direction of the parallax is considered, an offset amount of the search range is constant at any position in the display screen. Therefore, in the case where distances to the objects in the display screen differ or the like, the search range cannot be always properly set and there is a fear that a correct parallax vector cannot be detected.

In an image pickup apparatus in which a right camera and a left camera are horizontally disposed in one casing, generally, only an offset of an image in the horizontal direction that is caused by the parallax between two cameras occurs. However, in the case of an image pickup apparatus in which each camera has a rotation correction function, there is a case where, upon photographing, an offset in the vertical direction occurs in the image photographed by each camera due to an influence by a vibration or the like caused by a photographer. In view of this, in the above related art, although the offset in the horizontal direction based on the parallax is considered, it cannot cope with the offset in the vertical direction. Therefore, in the above related art, since the offset in the vertical direction that is caused by the differences among the positions of a plurality of cameras is not considered, such a problem that the proper search range is not set and a precision of the parallax vector prediction deteriorates occurs.

SUMMARY OF THE INVENTION

It is an aspect of the invention to solve the foregoing problems in the related art and to provide stereo image encoding apparatus and method in which an encoding with a small deterioration in an image can be performed by enabling a correct parallax vector to be detected.

According to an aspect of the invention, there is provided an image encoding apparatus for encoding a plurality of image signals obtained by picking up an object with a plurality of image pickup units, comprising: an input unit configured to input the plurality of image signals; an encoding unit configured to encode the plurality of input image signals on a predetermined pixel block basis and perform an inter-prediction among the plurality of image signals on the predetermined pixel block basis; a generation unit configured to generate difference information showing an offset of the images between an encoding-subject block of the encoding unit and a pixel block at a position corresponding to that of the encoding-subject block in a reference image which is referred to by the inter-prediction; and a setting unit configured to adaptively set a search range for detecting a vector which is used for the encoding-subject block in the inter-prediction, in accordance with the difference information generated by the generation unit.

Further features of the present invention will become apparent from the following description of exemplary embodiments with reference to the attached drawings.

DESCRIPTION OF THE EMBODIMENTS

Exemplary embodiments of the invention will be described in detail hereinbelow with reference to the drawings.

First Embodiment

The first embodiment of a stereo image encoding apparatus according to the invention will be described in detail hereinbelow with reference to FIGS. 1, 2A, 2B, 3A, and 3B.

Figure 1:
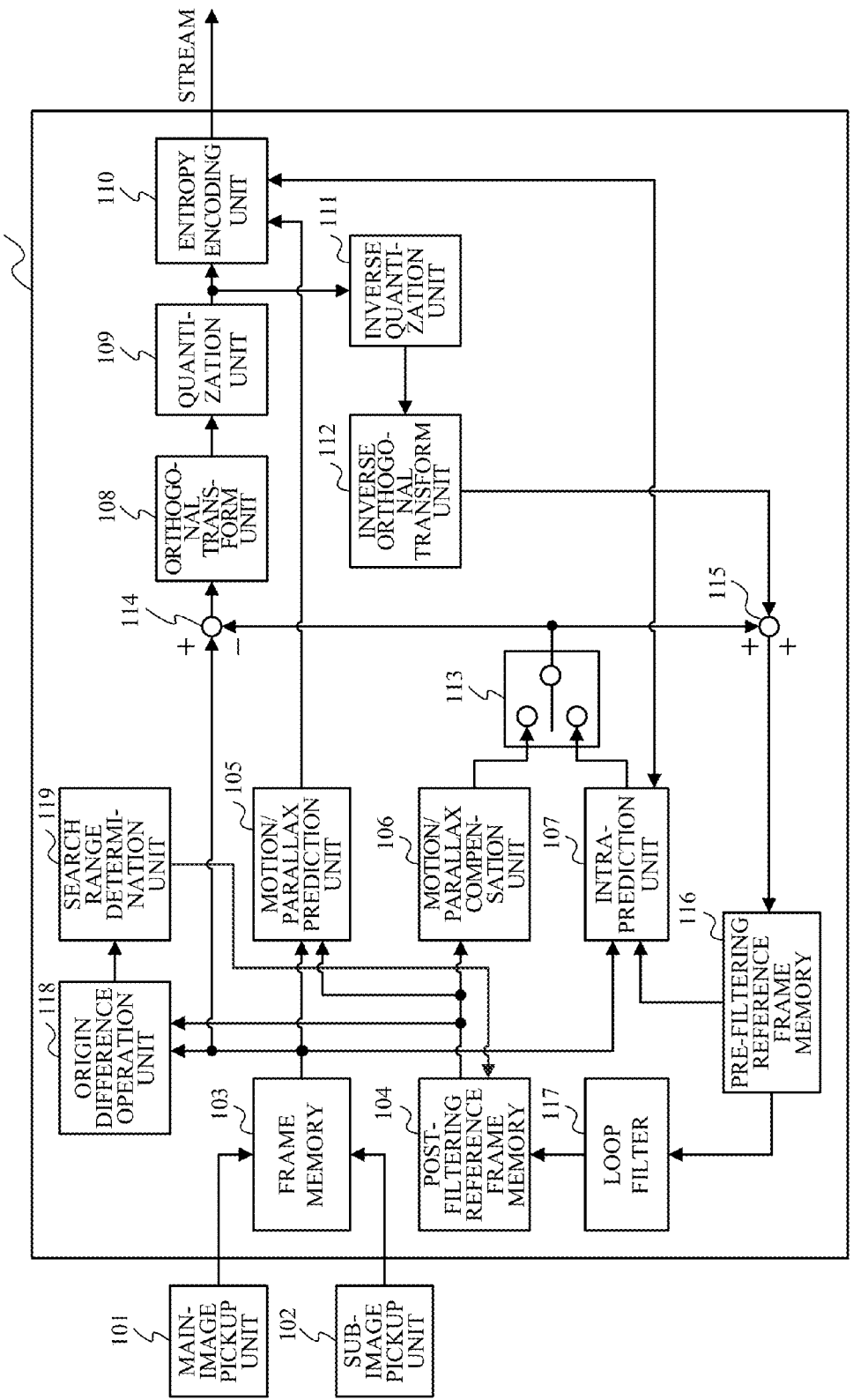
FIG. 1 is a block diagram illustrating a constructional example of a stereo image encoding apparatus according to the first embodiment of the invention.

FIG. 1 is a block diagram of a stereo image encoding apparatus according to the embodiment. The operation of the encoding apparatus is controlled by a method whereby a control unit of an apparatus (for example, a camera, PC, or the like) which uses the stereo image encoding apparatus of the present invention loads and executes, for example, a control program. In this case, a processing in each block of the stereo image encoding apparatus of the invention can be provided as a part of the control program.

As illustrated in FIG. 1, a stereo image encoding apparatus 100 according to the present embodiment has a construction, for example, for inputting and encoding a plurality of images of an object picked up by a main-image pickup unit 101 and a sub-image pickup unit 102 which are disposed in parallel. Specifically speaking, the apparatus 100 has a frame memory 103 to hold the plurality of input images, an arrangement to encode the held images, and an arrangement to set a search range for detecting a parallax vector. The encoding arrangement includes a post-filtering reference frame memory 104, a motion/parallax prediction unit 105, a motion/parallax compensation unit 106, an intra-prediction unit 107, an orthogonal transform unit 108, a quantization unit 109, and an entropy encoding unit 110. The encoding arrangement further includes an inverse quantization unit 111, an inverse orthogonal transform unit 112, an intra/inter determination unit 113, a subtractor 114, an adder 115, a pre-filtering reference frame memory 116, and a loop filter 117. A setting arrangement of the search range includes an origin difference operation unit 118 and a search range determination unit 119.

In the above arrangement, first, a method of encoding the input images held in the frame memory 103 will be described.

It is assumed that each of the main-image pickup unit 101 and the sub-image pickup unit 102 includes: a photographing lens; an image pickup element to photoelectrically convert an image formed through the photographing lens; and an A/D conversion processing unit for converting an analog signal read out of the image pickup element into a digital signal; and the like. Each of the main-image pickup unit 101 and the sub-image pickup unit 102 forms a luminance signal and a color difference signal from the converted digital signal and outputs them. In the following description of the embodiments, it is assumed that the luminance signal and color difference signal are referred to as an image signal. In the present embodiment, it is assumed that the main-image pickup unit 101 photographs a left image and the sub-image pickup unit 102 photographs a right image. It is also assumed that although the sub-image can use the main-image as a reference image, the main-image cannot use the sub-image as a reference image.

The stereo image encoding apparatus 100 inputs the image signals which are output from the image pickup units 101 and 102 and stores each of the main-images and sub-images into the frame memory 103 in a display order. The encoding is performed on a predetermined pixel block (for example, macro block) basis. The image signals are read out of the frame memory 103 in an encoding order on a pixel block basis (for example, encoding-subject block in FIG. 7A) and are input to the motion/parallax prediction unit 105, intra-prediction unit 107, subtractor 114, and origin difference operation unit 118, respectively.

The post-filtering reference frame memory 104 stores the encoded image (local decoded image which is decoded after it is encoded) subjected to a filter processing as a reference image and transmits the reference images of the encoding-subject blocks to the motion/parallax prediction unit 105 and the motion/parallax compensation unit 106 in the encoding order, respectively. In the case where the parallax prediction is executed due to the reason that the encoding-subject block from the frame memory 103 is the sub-image, the encoding-subject block and the pixel block of the reference image at the position (same coordinate position) corresponding to that of the encoding-subject block are transmitted to the origin difference operation unit 118.

The pre-filtering reference frame memory 116 stores the encoded image (local decoded image which is decoded after it is encoded) before it is subjected to the filter processing as a reference image and sequentially transmits the reference images of the encoding-subject blocks to the intra-prediction unit 107 in the encoding order.

The origin difference operation unit 118 arithmetically operates a sum of absolute pixel difference values of the encoding-subject block and the reference image at the position (same coordinate position) corresponding to that of the encoding-subject block between the main-image and the sub-image, generates information (difference information) showing a result of the arithmetic operation, and transmits to the search range determination unit 119.

In the case of performing the parallax prediction as one of the inter-predictions, the search range determination unit 119 decides a search range of the parallax prediction in accordance with the sum of absolute pixel difference values expressed by the information which is transmitted from the origin difference operation unit 118 and transmits the decided search range to the post-filtering reference frame memory 104. In the case of performing a motion prediction, a predetermined search range is set and transmitted to the post-filtering reference frame memory 104. As a search range setting method at the time of performing the motion prediction, although a method of performing the motion prediction at a position around the same position as that of the encoding-subject block or at a position around a motion vector which previously is obtained or the like may be considered, the search range setting method is not limited here in particular. A method of deciding the search range at the time of performing the parallax prediction will be described in detail hereinafter.

The motion/parallax prediction unit 105 changes the processing in accordance with a discrimination result about whether the encoding-subject block which is transmitted from the frame memory 103 is the main-image or the sub-image.

When it is the main-image, the local decoded image of the main-image which is transmitted from the post-filtering reference frame memory 104 and is encoded and then decoded precedently is used as a reference image, and the motion vector is detected and transmitted to the motion/parallax compensation unit 106 together with a reference image data number.

When it is the sub-image, the local decoded image of the main-image which has the same display order as the sub-image and is encoded and then decoded precedently or the local decoded image of the sub-image which is encoded and then decoded precedently is read out of the post-filtering reference frame memory 104. Subsequently, the read-out local decoded image is used as a reference image to detect the motion vector or parallax vector. The detected motion vector or parallax vector is transmitted to the motion/parallax compensation unit 106 together with the number of the reference image data.

A method whereby, in the case of the sub-image, which one of the local decoded image of the sub-image and the local decoded image of the main-image of the same display order as that of the sub-image is selected as a final reference image is not limited here in particular. In the present embodiment, it is assumed that the local decoded image in which a difference value between the encoding-subject block at the vector position and the reference image is smaller is selected.

The motion/parallax compensation unit 106 forms prediction image data of each block by using the motion vector or parallax vector sent from the motion/parallax prediction unit 105. That is, with reference to the reference image shown by the reference image data number in the post-filtering reference frame memory 104, the prediction image data of each block is formed and transmitted to the intra/inter determination unit 113.

The intra-prediction unit 107 forms an intra-prediction image with respect to each of a plurality of intra-prediction modes by using the local decoded images around the encoding-subject block which is transmitted from the pre-filtering reference frame memory 116. A block matching is performed by using the encoding-subject block which is transmitted from the frame memory 103 and the plurality of formed prediction images. The intra-prediction mode which provides a largest correlation is selected and transmitted to the intra/inter determination unit 113 together with the corresponding prediction image.

The intra/inter determination unit 113 selects the prediction image data having the large correlation with the encoding-subject block from among the prediction image data transmitted from the motion/parallax compensation unit 106 and the intra-prediction unit 107 and transmits the selected prediction image data to the subtractor 114. As a method of selecting the prediction image data having the large correlation, for example, a method of selecting the prediction image in which the difference value between the encoding-subject block and the prediction image is small or the like is considered. However, the method is not limited in particular.

The subtractor 114 calculates a difference between the encoding-subject block which is transmitted from the frame memory 103 and the prediction image block which is transmitted from the intra/inter determination unit 113 and outputs image residual data.

The orthogonal transform unit 108 subjects the image residual data which is output from the subtractor 114 to an orthogonal transform processing and transmits a transform coefficient to the quantization unit 109.

The quantization unit 109 quantizes the transform coefficient by using a predetermined quantization parameter and transmits to the entropy encoding unit 110 and the inverse quantization unit 111.

The entropy encoding unit 110 inputs the transform coefficient quantized by the quantization unit 109, performs an entropy encoding such as CAVLC, CABAC, or the like, and outputs as encoded data.

Subsequently, a method of forming reference image data by using the transform coefficient quantized by the quantization unit 109 will be described.

The inverse quantization unit 111 inversely quantizes the quantized transform coefficient which is transmitted from the quantization unit 109.

The inverse orthogonal transform unit 112 inversely orthogonal-transforms the transform coefficient which is inversely quantized by the inverse quantization unit 111, forms the decoded residual data, and transmits to the adder 115.

The adder 115 adds the decoded residual data and prediction image data, which will be described hereinafter, forms a local decoded image, that is, reference image data, and stores into the pre-filtering reference frame memory 116. The data held in the pre-filtering reference frame memory 116 is transmitted to the loop filter 117.

The loop filter 117 eliminates noises by filtering the reference image data and stores the reference image data after the filter processing into the post-filtering reference frame memory 104.

Subsequently, a method of setting the search range of the parallax prediction (inter-prediction) between the main-image and the sub-image by the search range determination unit 119, which is a feature of the invention, will be described in detail with reference to FIGS. 2A, 2B, 3A, and 3B.

The search range determination unit 119 sets the search range to the same position as that of the encoding-subject block in the reference image. At this time, if the sum of absolute pixel difference values which is transmitted from the origin difference operation unit 118 is large, the search range which is set is widened, thereby lowering a search precision. That is, if the sum of absolute pixel difference values is larger than a predetermined threshold value, the search range determination unit 119 sets the search range so as to roughly search the wide search range.

If the sum of absolute pixel difference values is smaller, the search range is set to be narrower than that in the case where the sum is larger. That is, when the sum of absolute pixel difference values is so small to be equal to or less than the predetermined threshold value, the search range determination unit 119 roughly sets the search range so as to finely search the narrow search range.

The search range determination unit 119 adjusts in such a manner that processing loads which are applied to the search per unit time are substantially equalized between the case where the sum of absolute pixel difference values is larger and the case where it is not larger. For example, the search range determination unit 119 sets the search precision in such a manner that the number of times of searches per unit time remains constant (a constant value).

For example, when the sum of absolute pixel difference values is larger than the predetermined threshold value, the search range is set to 32 pixels in the horizontal direction and to 16 pixels in the vertical direction, thereby setting the search precision in such a manner that the search is performed every fourth pixel. On the other hand, when the sum of absolute pixel difference values is so small to be equal to or less than the predetermined threshold value, the search range is set to 8 pixels in the horizontal direction and to 4 pixels in the vertical direction and the search precision is set to 1 pixel. Thus, the numbers of search times in both of the above cases are equal to 153.

The reason why the numbers of search times are set to the same value irrespective of an area of the search range is to prevent such a situation that the encoding cannot be performed in a real-time manner due to an increase in number of search times.

Figure 2A:
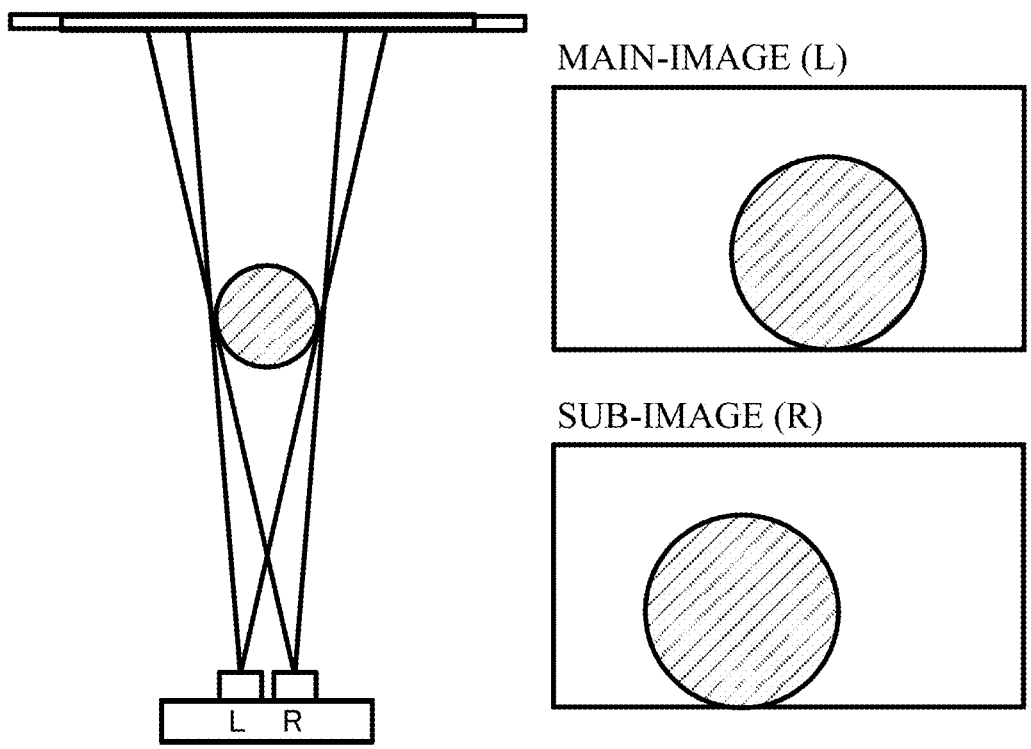
FIGS. 2A and 2B are diagrams used to explain a setting method of a search range of a parallax prediction according to the first embodiment of the invention.
Figure 2B:
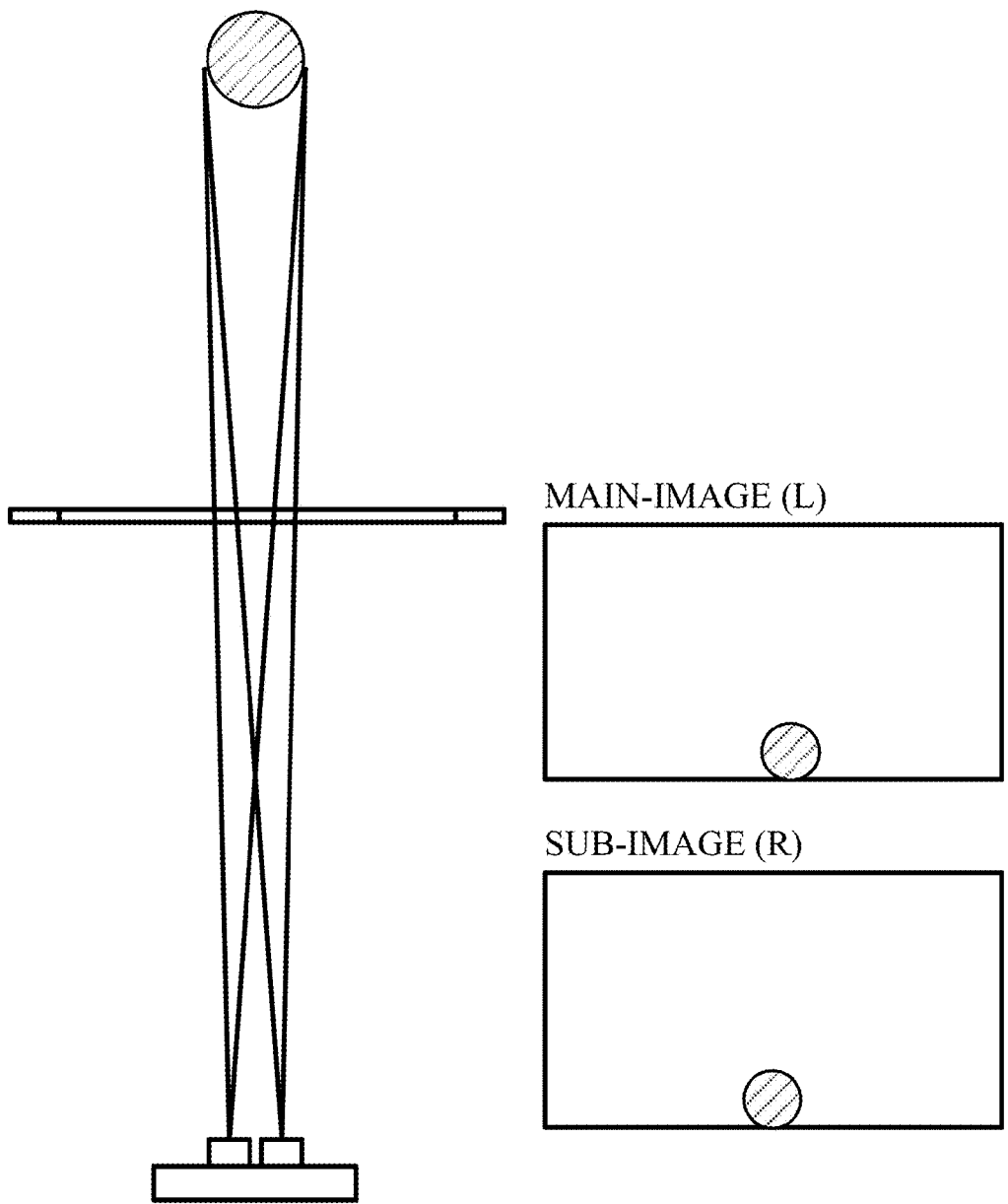

The reason why the search range is adaptively set in accordance with the sum of absolute pixel difference values between the main-image and the sub-image as mentioned above will now be described with reference to FIGS. 2A, 2B, 3A, and 3B. FIGS. 2A and 2B are diagrams illustrating a state where a spherical object (object to be photographed) is photographed by using a double-lens image pickup apparatus.

Figure 3A:
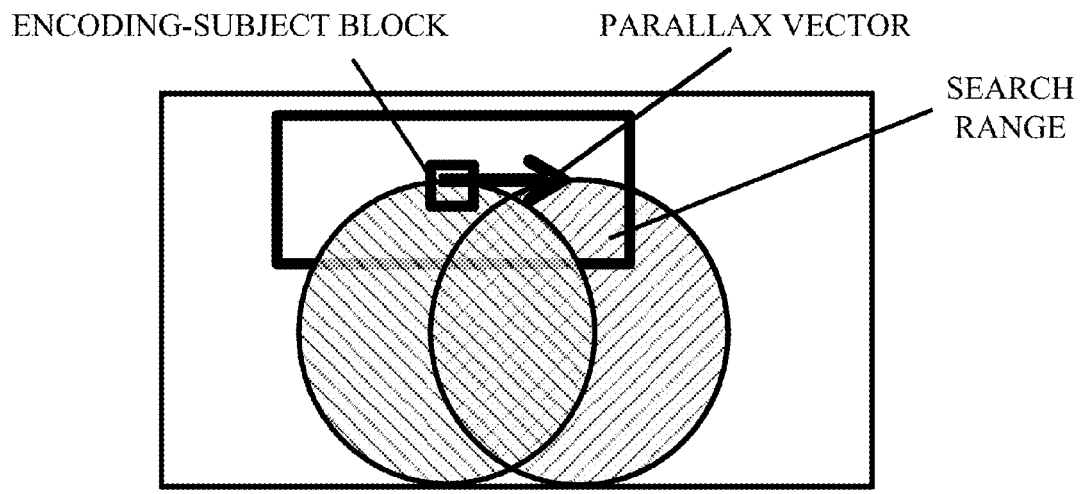
FIGS. 3A and 3B are diagrams used to explain a setting method of the search range of the parallax prediction according to the first embodiment of the invention.

When a distance between the spherical object and the image pickup apparatus is small as illustrated in FIG. 2A, there is a large difference between the main-image and the sub-image and the parallax vector is large in many cases. Thus, unless the search range is widened as illustrated in FIG. 3A, a possibility that the correct parallax vector cannot be detected is high. Therefore, if there is a large difference between the main-image and the sub-image, since a possibility that the parallax between the main-image and the sub-image is large is high, in the present embodiment, the search range is widened even if the search precision is lowered.

Figure 3B:
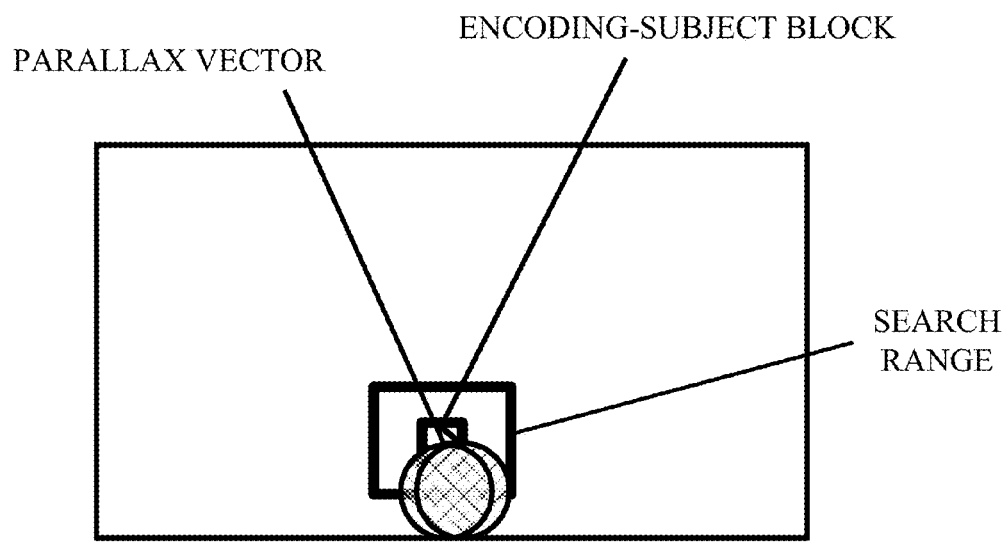

On the other hand, when the distance between the spherical object and the image pickup apparatus is large as illustrated in FIG. 2B, the difference between the main-image and the sub-image is small and the parallax vector is also small in many cases. Thus, even if the search range is narrow as illustrated in FIG. 3B, the correct parallax vector can be easily detected. Therefore, if there is a small difference between the main-image and the sub-image, since a possibility that the parallax between the main-image and the sub-image is small is high, in the present embodiment, the search range is narrowed and the search precision is raised so that the more correct parallax vector is detected.

As mentioned above, in the present embodiment, such a phenomenon that since the distances to the object differ every encoding-subject block, the pixel difference values differ is used, the search range of the suitable size is individually and adaptively set every encoding-subject block, and the apparatus is made operative so as to obtain the more correct parallax vector in any case.

Although the change of the search range and search precision of the parallax vector is performed at two stages of the case where the sum of absolute pixel difference values is equal to or less than the predetermined threshold value and the case where the sum of absolute pixel difference values is larger than the predetermined threshold value in the embodiment, it may be performed at three or more stages by increasing the number of threshold values. For example, the search range and the search precision can be set in such a manner that the larger the sum of absolute pixel difference values is, the wider the search range is and the more the search precision is roughly set.

For example, when the sum of absolute pixel difference values is larger than a first threshold value, the search range is set to 32 pixels in the horizontal direction and to 16 pixels in the vertical direction, thereby setting the search precision in such a manner that the search is performed every fourth pixel. When the sum of absolute pixel difference values is smaller than a second threshold value, the search range is set to 8 pixels in the horizontal direction and to 4 pixels in the vertical direction and the search precision is set to 1 pixel. Further, when the sum of absolute pixel difference values is larger than the second threshold value and is smaller than the first threshold value, the search range is set to 16 pixels in the horizontal direction and to 8 pixels in the vertical direction, thereby setting the search precision in such a manner that the search is performed every second pixel. Even if the search range is set in this manner, the numbers of search times in any of the above cases are equal to 153.

Although the parallax prediction is not performed for the main-image in the embodiment, even when the parallax prediction is performed for the main-image, the search range can be set by a method similar to that mentioned above.

Although the real-time operation of the encoding processing is compensated by equalizing the search precisions of the search ranges of the different sizes in the first embodiment, the high search precision can be also set with respect to the wide search range so long as it lies within a range where the real-time processing is compensated. Subsequently, a modification of the first embodiment constructed so as to set the search precision as mentioned above will now be described hereinbelow.

Figure 4:
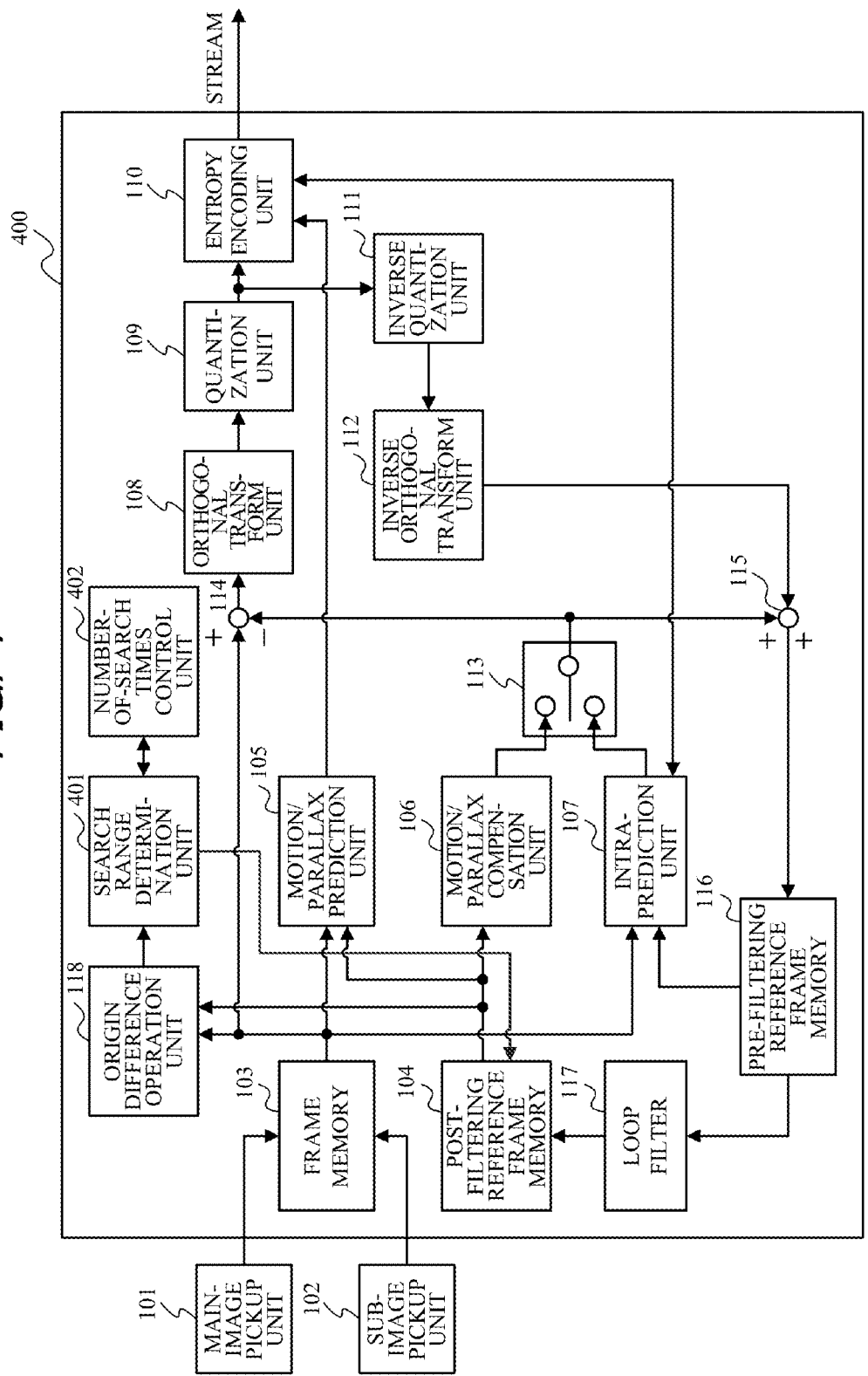
FIG. 4 is a block diagram illustrating a modification of the stereo image encoding apparatus according to the first embodiment of the invention.

FIG. 4 is a block diagram of a stereo image encoding apparatus according to the modification of the first embodiment mentioned above. Although a construction of a stereo image encoding apparatus 400 in FIG. 4 is substantially the same as that of the first embodiment, it differs therefrom in a point that it has a number-of-search times control unit 402 and a point that the search precision can be set by a search range determination unit 401 without lowering the search precision.

Since the operation of the construction other than the number-of-search times control unit 402 and the search range determination unit 401 is similar to that of the first embodiment, its description is omitted here. In this modification, it is also assumed that the main-image pickup unit 101 and the sub-image pickup unit 102 are disposed in parallel.

The search range determination unit 401 sets the search range to the same position as that of the encoding-subject block in a manner similar to that in FIGS. 3A and 3B. At this time, when the sum of absolute pixel difference values is larger than the predetermined threshold value and a signal to permit the widening of the search range is generated from the number-of-search times control unit 402, the search range is widened. A method of generating the signal to permit the widening of the search range from the number-of-search times control unit 402 will be described hereinafter. If the sum of absolute pixel difference values is so small to be equal to or less than the predetermined threshold value, the search range is narrowed. In the present modification, when the permission signal is generated, even if the search range is widened, the search precision is not lowered, and when the search range is widened, the search range determination unit 401 transmits a signal showing that the search range is widened to the number-of-search times control unit 402.

In accordance with, for example, a control program, the number-of-search times control unit 402 sets N indicative of the number of encoding-subject blocks in which the search range can be widened in one picture, before the encoding of one picture is performed and outputs the signal to permit the widening of the search range to the search range determination unit 401. After the start of the encoding of the picture, 1 is subtracted from the set value of N each time the signal showing that the search range is widened is transmitted from the search range determination unit 401. When the value of N reaches 0, the processing to output the signal to permit the widening of the search range to the search range determination unit 401 is stopped.

By controlling as mentioned above, while the signal to permit the widening of the search range is generated, even if the search range is widened, the parallax vector can be searched for without lowering the search precision. By setting an upper limit of an output period of time of the signal to permit the widening of the search range, the real-time encoding processing can be compensated.

Subsequently, another modification of the first embodiment will be described. This modification relates to the stereo image encoding apparatus constructed in such a manner that the setting control of the search range of the parallax vector is performed with respect to not only a size but also a setting position of the search range. However, it is not always necessary to perform the setting control of the search range in this modification together with the setting control of the size of the search range but a construction in which only the setting position is controlled without changing the size of the search range can be also used. In any of the above cases, the construction of the stereo image encoding apparatus is substantially the same as that illustrated in FIG. 1 and this modification can be accomplished by changing the control construction (for example, control program) of the search range determination unit 119.

The stereo image encoding apparatus according to the present modification will be described with reference to FIGS. 1, 2A, 2B, 5A, and 5B. Although the construction of the stereo image encoding apparatus according to the present modification is substantially the same as that of the first embodiment (FIG. 1), it differs therefrom in a point that the search range determination unit 119 has such a function that the setting position of the search range can be changed in accordance with the sum of absolute pixel difference values which is transmitted from the origin difference operation unit 118. In the present modification, it is also assumed that the main-image pickup unit 101 and the sub-image pickup unit 102 are disposed in parallel. Since the operation of the construction other than the search range determination unit 119 is similar to that of the first embodiment, its description is omitted here. That is, only the position setting function of the search range of the search range determination unit 119 will be described.

The search range determination unit 119 decides the search range setting position by using the sum of absolute pixel difference values between the main-image and the sub-image which is transmitted from the origin difference operation unit 118. At this time, when the sum of absolute pixel difference values which is transmitted from the origin difference operation unit 118 is larger than the predetermined threshold value, the search range is moved from the position of the encoding-subject block to the right by a predetermined distance. On the other hand, the sum of absolute pixel difference values is so small to be equal to or less than the predetermined threshold value, the search range is set to the same position as that of the encoding-subject block. The threshold value in this case is properly set fundamentally irrespective of the threshold value which is used in the setting of the size of the search range. However, when the modification is used in combination with the size control function of the search range, the threshold value may be properly set as a threshold value which is common to both of the above functions.

Although the stage at which the position of the search range of the parallax vector is changed is set to the two stages of the case where the sum of absolute pixel difference values is smaller than one threshold value and the case where it is larger than the threshold value, the number of stages of the change may be increased by setting another threshold value.

As mentioned above, the function of the search range determination unit 119 may be limited to the function of the modification or may be set to a function combined with the size change function in the first embodiment.

Figure 5A:
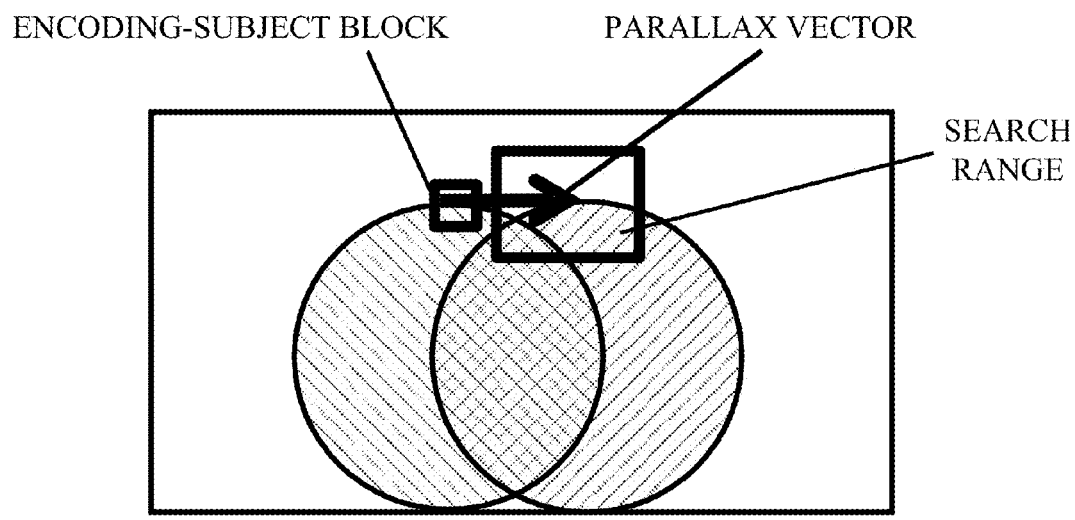
FIGS. 5A and 5B are diagrams used to explain another modification of the setting method of the search range of the parallax prediction according to the first embodiment of the invention.
Figure 5B:
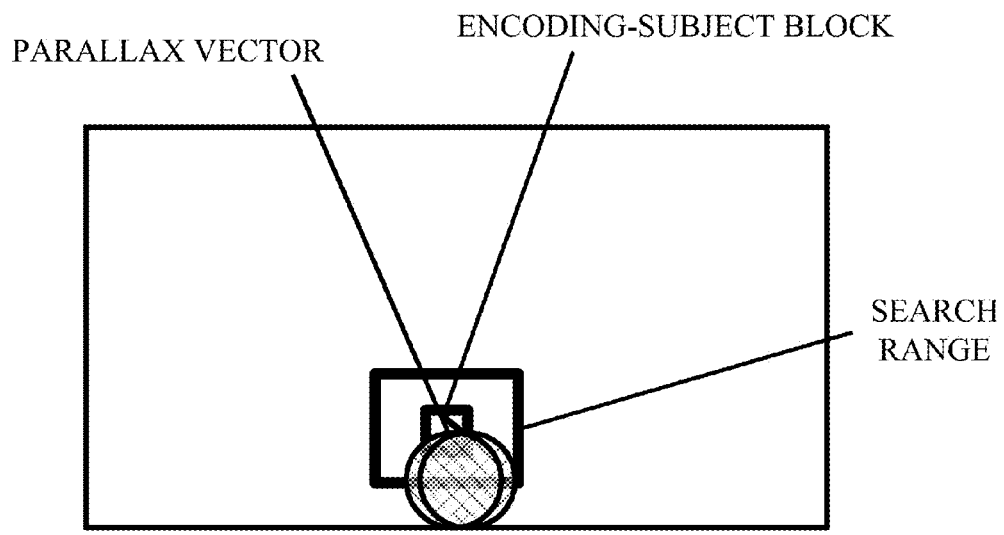

The reason why the position of the search range is adaptively changed as mentioned above will now be described with reference to FIGS. 2A, 2B, 5A, and 5B. FIGS. 5A and 5B are diagrams for describing the setting method of the search range in the modification. Also in the modification, it is assumed that the image picked up by the image pickup unit on the left side of the camera is the main-image and the image picked up by the image pickup unit on the right side is the sub-image.

When the distance between the spherical object and the image pickup unit is small as illustrated in FIG. 2A, there is a large difference between the main-image and the sub-image (parallax between the image pickup units) and the parallax vector is large in many cases. However, if the image pickup units are disposed in parallel, the object in the right image exists certainly at the position having an offset in the right direction in the left image. Therefore, in the modification, if there is a large difference between the main-image and the sub-image, the more correct parallax vector can be detected by deviating the search range to the right as illustrated in FIG. 5A. On the other hand, if the distance between the spherical object and the image pickup unit is large as illustrated in FIG. 2B, the difference between the main-image and the sub-image is small and the parallax vector is also small in many cases. Therefore, the correct parallax vector can be detected even if the search range is not moved from a peripheral position of the encoding-subject block as illustrated in FIG. 5B.

If the setting position of the search range is determined as shown in the present modification, the position of the search range can be adaptively set in accordance with the pixel difference which is based on the parallax, and the proper parallax vector can be searched for.

Although the stereo image encoding apparatus of the first embodiment including the two modifications as described above has been described with respect to the case of applying to the image pickup apparatus having a plurality of image pickup units as an example, the invention is not limited to it. For example, in a processing apparatus such as a PC or the like, it can be also applied to the encoding processing of a plurality of images for the stereo images which are read out of a recording medium. In this case, the encoding function of the invention is realized as an application which is executed by a control apparatus of the PC.

Second Embodiment

Although the invention is applied to a plurality of images picked up by a plurality of image pickup units disposed in parallel in the first embodiment, an example in which the invention is applied to a plurality of images obtained from a plurality of image pickup units having a rotation correction function will be described in the following second embodiment.

Figure 6:
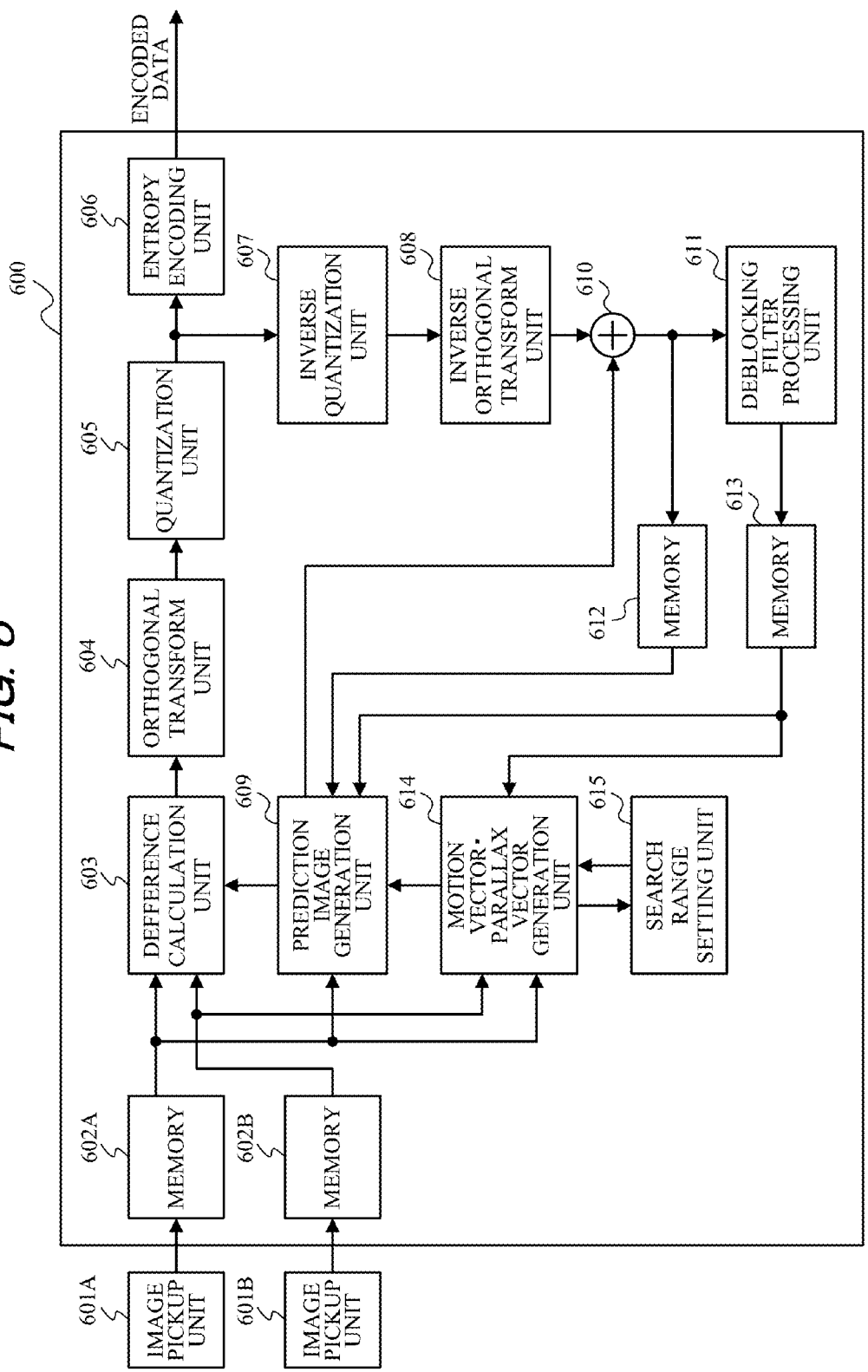
FIG. 6 is a block diagram of a stereo image encoding apparatus according to the second embodiment of the invention.

FIG. 6 is a block diagram of a stereo image encoding apparatus 600 according to the embodiment.

First, although component elements of the stereo image encoding apparatus 600 according to the present embodiment will be described, an arrangement of the encoding excluding the setting arrangement construction of the search range of the parallax vector is similar to that of the first embodiment. That is, the stereo image encoding apparatus 600 of the present embodiment has such an arrangement that a plurality of images picked up by an image pickup unit 601A for picking up the main-image and an image pickup unit 601B for picking up the sub-image are input and held in frame memories 602A and 602B and a plurality of held images are encoded. The encoding processing is executed on a unit basis of a pixel block (for example, macro block) constructed by a predetermined number of pixels in a manner similar to the first embodiment (refer to FIG. 7A). It is assumed that each of the image pickup units 601A and 601B includes a lens, an image pickup element for photoelectrically converting an image formed through the lens, an A/D conversion processing unit for converting an analog signal read out of the image pickup element into a digital signal, and the like. Each of the image pickup units forms a luminance signal and a color difference signal (image signal) from the converted digital signal and outputs them.

Subsequently, a flow for the encoding processing will be simply described.

The main-image and sub-image held in each of the frame memories 602A and 602B are sent to a difference calculation unit 603 (corresponding to 114 in FIG. 1), a prediction image generation unit 609, and a motion vector/parallax vector generation unit 614. The difference calculation unit 603 calculates a difference value between the prediction image generated by the prediction image generation unit 609 and the main-image sent from the frame memory 602A or a difference value between the prediction image generated by the prediction image generation unit 609 and the sub-image sent from the frame memory 602B.

In the motion vector/parallax vector generation unit 614, the processing differs in dependence on whether the encoding-subject image is the main-image or the sub-image. If the encoding-subject image is the main-image, search is performed in a search range set by a search range setting unit 615 to a reference image which is sent from a memory 613 and has already been subjected to a filter processing in a deblocking filter processing unit 611. By obtaining, by the search, a position of a pixel block in which the difference value between the prediction image and the main-image serving as an encoding-subject image is small, the motion vector is generated. The generated motion vector is output to the prediction image generation unit 609. If the encoding-subject image is the sub-image, search is performed in the search range set by the search range setting unit 615 to the main-image which is input. By obtaining, by the search, a position of a pixel block in which the difference value between the prediction image and the sub-image serving as an encoding-subject image is small, the parallax vector is generated. The generated parallax vector is output to the prediction image generation unit 609.

The difference value calculated by the difference calculation unit 603 is orthogonally transformed by an orthogonal transform unit 604 and, further, quantized by a quantization unit 605 on the basis of a predetermined quantization parameter. The quantized data is sent to an entropy encoding unit 606 and an inverse quantization unit 607. The entropy encoding unit 606 encodes the quantized data sent from the quantization unit 605 by an entropy encoding method such as CABAC (Context-adaptive binary arithmetic coding) or the like and outputs the encoded data.

The inverse quantization unit 607 inversely quantizes the quantized data sent from the quantization unit 605 and, further, executes an inverse orthogonal transformation by an inverse orthogonal transform unit 608, thereby forming difference value data. An adder 610 adds the prediction image which is output from the prediction image generation unit 609 and the difference value data which is output from the inverse orthogonal transform unit 608, thereby forming a reference image. The formed reference image data is sent to a memory 612 and the deblocking filter processing unit 611. The deblocking filter processing unit 611 sends the filter-processed reference image data which is formed by applying the filter processing to the reference image data sent from the adder 610 to the memory 613.

Subsequently, a processing of the search range setting unit 615 will be described. The search range setting unit 615 executes different processings in the case where the encoding-subject image is the main-image and the case where it is the sub-image First, when the encoding-subject image is the main-image, the same position as that of the pixel block serving as an encoding-subject is set into the picture as a position of the search range and information showing such a position is sent to the motion vector/parallax vector generation unit 614.

Subsequently, a processing in the case where when the encoding-subject image is the sub-image will be described.

Figure 7A:
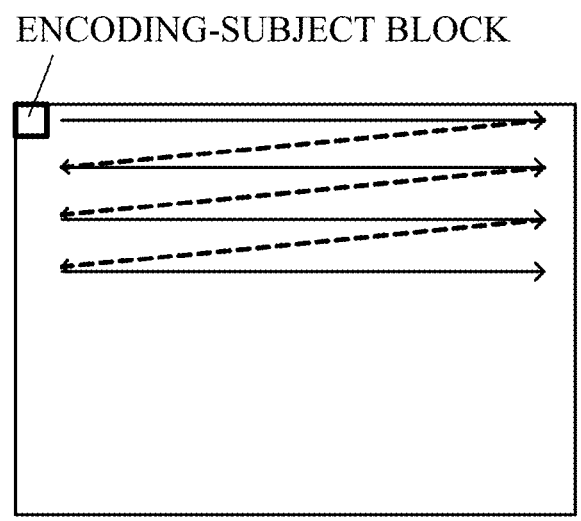
FIGS. 7A and 7B are diagrams illustrating starting order of an encoding processing and a search range upon starting according to the invention.
Figure 7B:
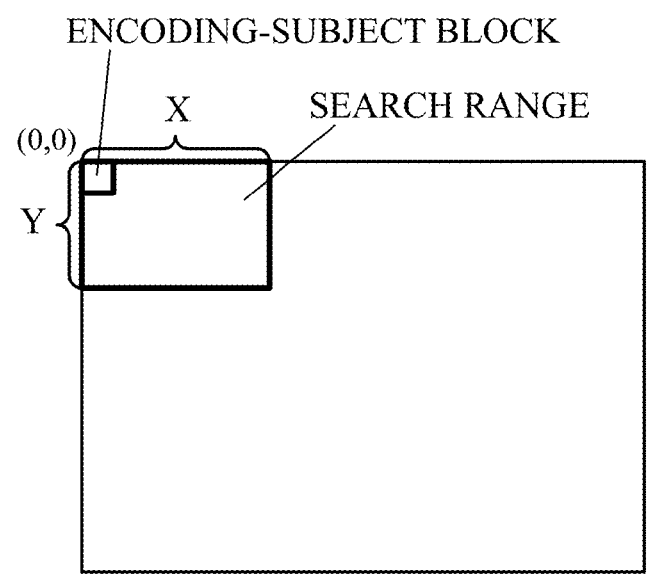
Figure 8:
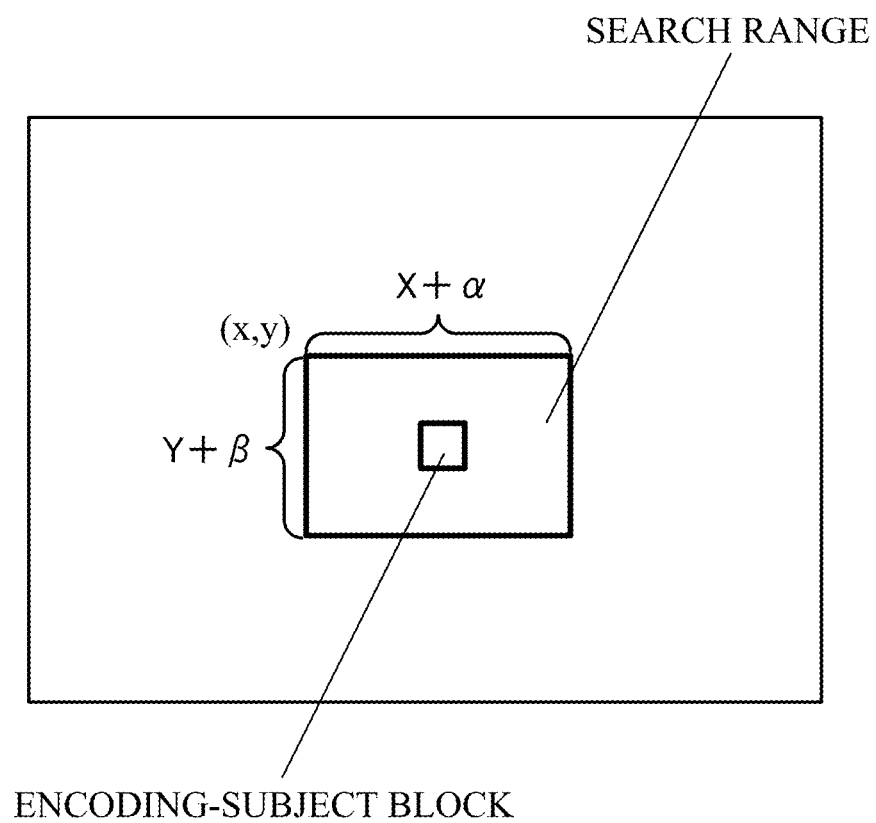
FIG. 8 is a diagram used to explain an encoding-subject image in the encoding processing according to the second embodiment of the invention.

As illustrated in FIG. 7A, the encoding processing is started from the left upper pixel block in the picture and is sequentially executed on a pixel block basis in the direction shown by arrows in the diagram. The search range at the time of processing the left upper macro block, that is, at the start of encoding is illustrated in FIG. 7B. In FIG. 7A, it is assumed that coordinates of a left upper point of the search range are set to (0, 0), the horizontal direction of the search range is set to X, and the vertical direction is set to Y. The search range setting unit 615 sets the search range as mentioned above and sends search range information to the motion vector/parallax vector generation unit 614. Further, the search range setting unit 615 receives the parallax vector information generated by the motion vector/parallax vector generation unit 614 and stores the parallax vector information as that of the same picture. The search range setting unit 615 sets the search range of the parallax vector on the basis of the stored parallax vector informations (parallax informations) of the same picture. FIG. 8 is a diagram illustrating a state where the encoding processing is sequentially executed from the left upper macro block in the picture and the encoding processing progresses to the pixel block at an almost intermediate point in the picture. At this time, the parallax vector informations generated during processing from the left upper macro block to the position of the encoding-subject block illustrated in FIG. 8 is stored. The search range setting unit 615 sets the position and shape of the search range on the basis of the stored informations.

Figure 9:
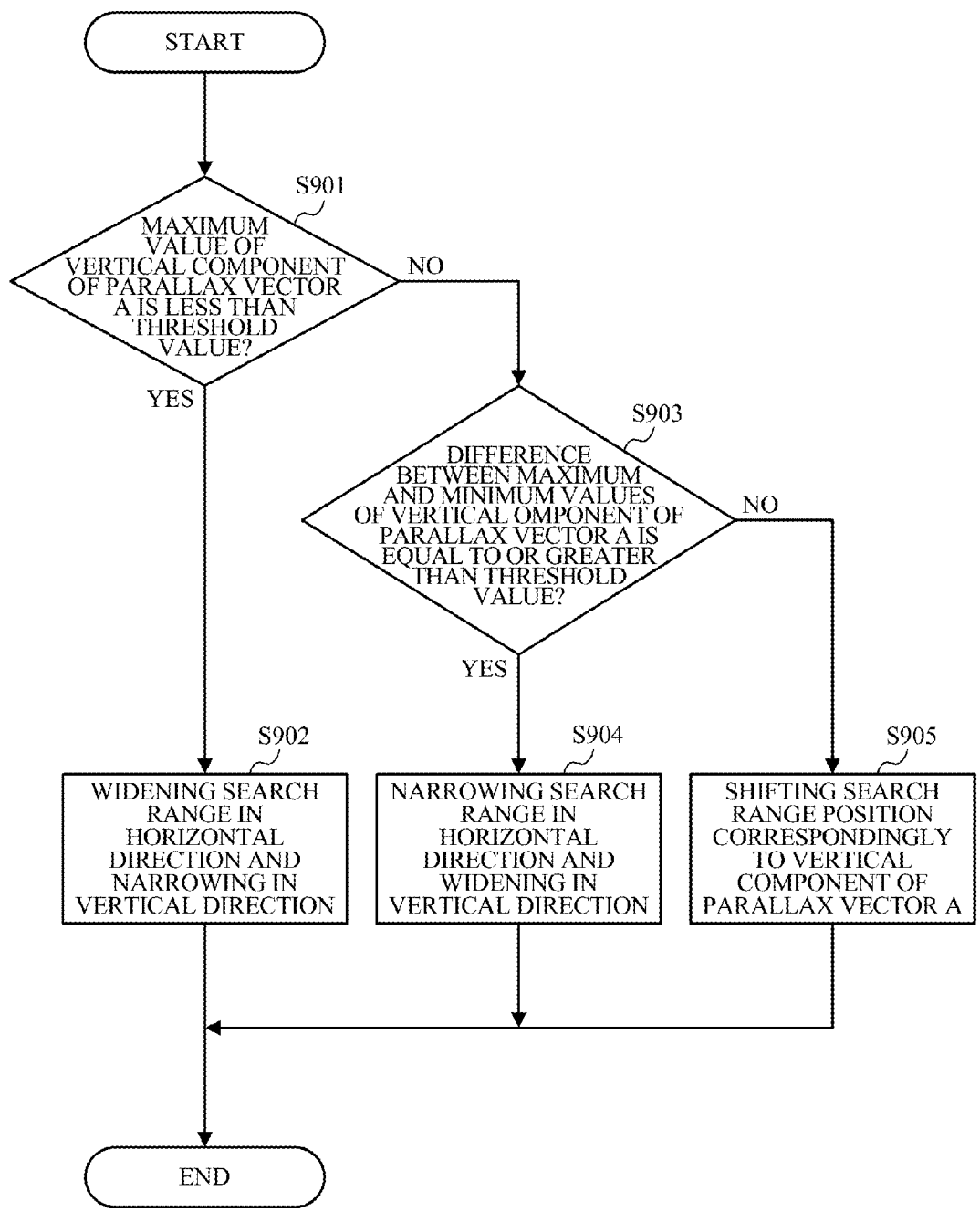
FIG. 9 is a diagrams illustrating a flowchart for a setting processing of the search range according to the second embodiment of the invention.

FIG. 9 is a flowchart illustrating the search range setting processing. In FIG. 9 and the following description, the stored parallax vector information in the same picture is assumed to be a parallax vector A. In step S901, whether or not a value (maximum value) of a vertical component of the stored parallax vector A is less than a threshold value is discriminated. If it is determined that the maximum value is less than the threshold value, in step S902, a setting value of the search range illustrated in FIG. 8 is widened in the horizontal direction and is narrowed in the vertical direction. That is, a value of α illustrated in FIG. 8 is set to a positive number and a value of β is set to a negative number. In this instance, a sum of the setting values in the horizontal direction and the vertical direction, that is, an area of the search range is not changed but only a ratio of the setting values in the horizontal direction and the vertical direction is changed. If it is determined in S901 that the maximum value is equal to or larger than the threshold value, the processing routine advances to S903. In S903, a difference value between the maximum value and the minimum value of the vertical component of the parallax vector A is calculated and whether or not the calculated difference value is equal to or greater than a predetermined threshold value is discriminated. If it is determined that the difference value is equal to or greater than the predetermined threshold value, in step S904, the setting value of the search range is narrowed in the horizontal direction and is widened in the vertical direction. That is, the value of α illustrated in FIG. 8 is set to the negative number and the value of β is set to the positive number. In a manner similar to S902, only the ratio of the setting values in the horizontal direction and the vertical direction is changed so as not to change an area of the search range serving as a product of the setting values in the horizontal direction and the vertical direction of the search range. If it is determined in step S903 that the difference value is less than the predetermined threshold value, the processing routine advances to step S905. In step S905, the ratio of the setting values in the horizontal direction and the vertical direction of the search range is not changed but the position of the search range is set to a position having an offset correspondingly to the vertical component (average value) of the parallax vector A.

As mentioned above, when the encoding-subject image is the sub-image, the stereo image encoding apparatus 600 of the present embodiment dynamically and adaptively sets the search range in the same picture by using the parallax vector of the encoding-processed pixel block in the same picture. Thus, the proper parallax vector can be searched for.

The stereo image encoding apparatus of the second embodiment has such a construction that the search range of the parallax vector is adaptively set in consideration of the offset of the image pickup units in the vertical direction in order to encode the images from a plurality of image pickup units having a rotation correction function. Although the setting position of the search range is corrected on the basis of the detected parallax vector in the embodiment of FIG. 6, a method whereby a rotation of the image pickup unit is detected and the position of the search range is corrected by the detected rotation as parallax information is also considered. Such an embodiment will be described subsequently as a third embodiment of the invention.

Third Embodiment

Figure 10:
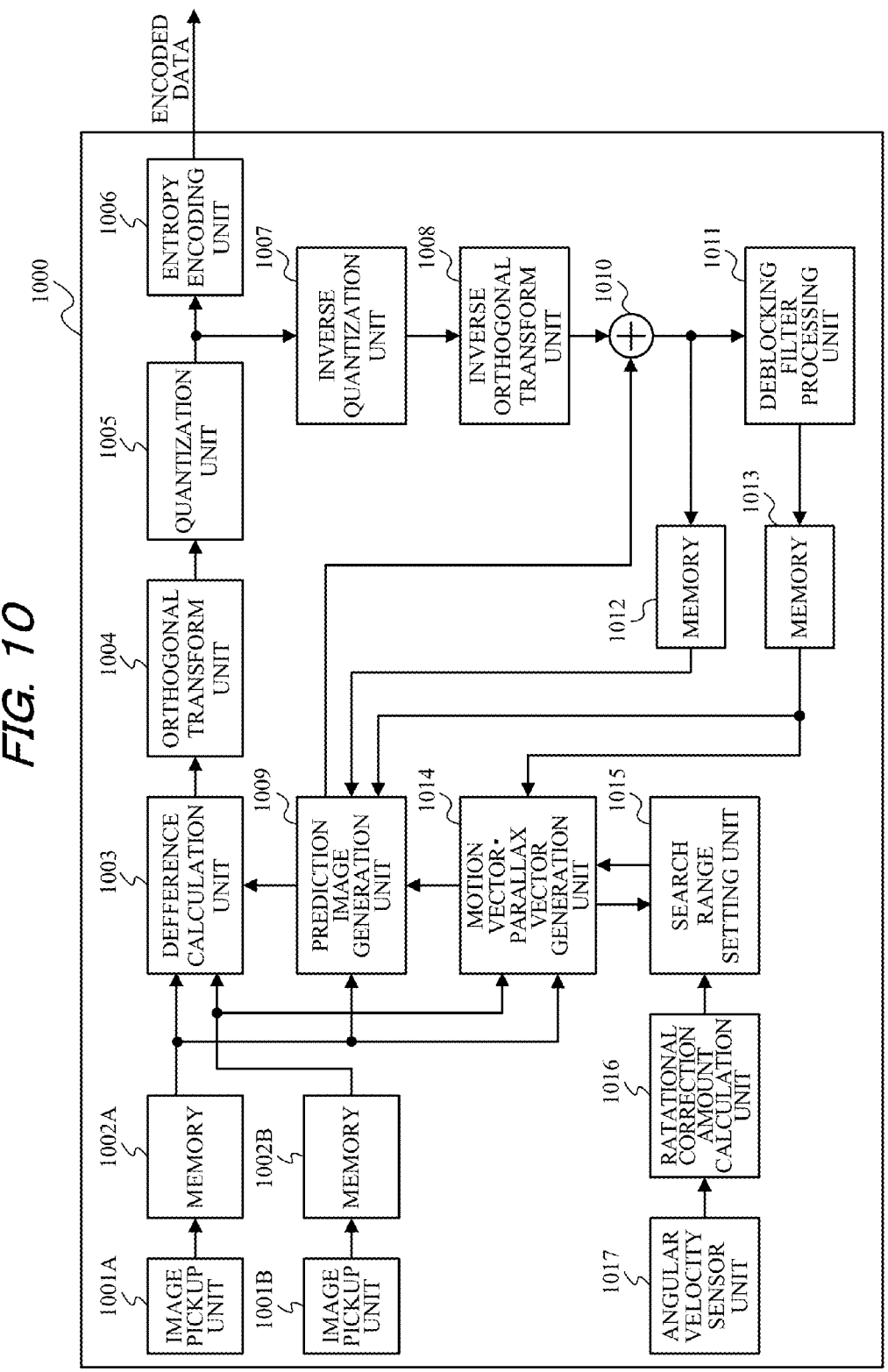
FIG. 10 is a block diagram of a stereo image encoding apparatus according to the third embodiment of the invention.

FIG. 10 is a block diagram of an image pickup apparatus using a stereo image encoding apparatus according to the third embodiment.

In FIG. 10, an image pickup apparatus 1000 using the stereo image encoding apparatus according to the embodiment has image pickup units 1001A and 1001B. In the diagram, component elements excluding the image pickup units 1001A and 1001B relate to a construction of the stereo image encoding apparatus according to the present embodiment. The image pickup apparatus includes memories 1002A and 1002B, a difference calculation unit 1003, an orthogonal transform unit 1004, a quantization unit 1005, an entropy encoding unit 1006, an inverse quantization unit 1007, an inverse orthogonal transform unit 1008, a prediction image generation unit 1009, and an adder 1010. The image pickup apparatus also includes a deblocking filter processing unit 1011, memories 1012 and 1013, and a motion vector/parallax vector generation unit 1014. Since the component elements 1001 to 1014 have functions similar to those of the component elements 601 to 614 illustrated in FIG. 6, their detailed description is omitted here.

An angular velocity sensor unit 1017 is a sensor such as a gyroscope or the like for detecting an angular velocity. A rotation correction amount calculation unit 1016 calculates a rotation correction amount from a value of the angular velocity detected by the angular velocity sensor unit 1017 and sends the calculated rotation correction amount to a search range setting unit 1015. The search range setting unit 1015 sets the search range on the basis of the rotation correction amount received from the rotation correction amount calculation unit 1016 and sends the setting value of the search range to the motion vector/parallax vector generation unit 1014. In the search range setting unit 1015, whether or not the rotation correction amount is less than a first threshold value is discriminated. If the rotation correction amount is less than the first threshold value, the setting value of the search range is widened in the horizontal direction and is narrowed in the vertical direction. Only the ratio of the setting values in the horizontal direction and the vertical direction is changed without changing the product of the setting values in the horizontal direction and the vertical direction, that is, without changing the area of the search range. Subsequently, if the rotation correction amount is equal to or greater than the first threshold value, whether or not the rotation correction amount is less than a second threshold value is further discriminated. If the rotation correction amount is less than the second threshold value, the setting value of the search range is narrowed in the horizontal direction and is widened in the vertical direction. Also in this case, only the ratio of the setting values in the horizontal direction and the vertical direction is changed without changing the area value serving as a product of the setting values in the horizontal direction and the vertical direction of the search range.

Subsequently, if the rotation correction amount is equal to or greater than the second threshold value, the setting value of the search range is narrowed in the horizontal direction and is widened in the vertical direction, and the position of the search range is set to a position having an offset in accordance with the rotation correction direction.

Although the rotation correction value is calculated by using the angular velocity sensor such as a gyroscope or the like in the present embodiment, it is assumed that another method may be used so long as a similar correction value can be calculated. For example, a method of arithmetically operating the direction and amount of rotation from a motion vector of an image which is obtained from a plurality of input image signals may be used. In this case, the angular velocity sensor unit 1017 is unnecessary, the encoding apparatus of the invention can be constructed separately from the image pickup units in a manner similar to the first and second embodiments, and it can be also applied to an image processing apparatus such as a PC or the like. Further, it can be also easily combined with the setting function of the search range in the first and second embodiments.

In the stereo image encoding apparatus according to the embodiment, since the parallax that is caused by the rotation of a plurality of image pickup units is considered upon encoding, the search range of the parallax vector can be dynamically and adaptively set, thereby enabling the proper parallax vector to be searched for and enabling the encoding with a small deterioration in picture quality to be performed.

Although the invention has been described in detail with respect to its exemplary embodiments, the invention is not limited to those specific embodiments but many various modifications within a range without departing from the essence of the invention are also incorporated in the invention. Further, each of the foregoing embodiments is nothing but an embodiment of the invention and those embodiments can be also properly combined.

Although the embodiments have been described with respect to the case where the invention is applied to the image pickup apparatus as an example, the invention is not limited to such an example. That is, the invention may be applied to an image processing apparatus such as a PC or the like. In this case, the stereo image signal is provided to the frame memory of the stereo image encoding apparatus of the invention from a recording medium in the apparatus or from an external recording medium.

As for the processings of the embodiments mentioned above, a storage medium in which a program code of software which embodies the functions is recorded may be provided to a system or an apparatus. A computer (or a CPU or MPU) of the system or apparatus reads out and executes the program code stored in the storage medium, so that the functions of the embodiments mentioned above can be realized. In this case, the program code itself read out of the storage medium realizes the functions of the embodiments mentioned above. The storage medium in which the program code is stored constructs the invention. As a storage medium for supplying such a program code, for example, a floppy (registered trade mark) disk, a hard disk, an optical disk, a magnetooptic disk, or the like can be used. Or, a CD-ROM, a CD-R, a magnetic tape, a non-volatile memory card, a ROM, or the like can be also used.

The invention incorporates not only a case where the functions of the embodiments mentioned above are realized by a method whereby a computer executes the read-out program code but also a case where an OS (operating system) or the like which operates on the computer executes a part or all of actual processings on the basis of instructions of the program code and the functions of the embodiments mentioned above are realized by those processings.

Further, the invention also incorporates a case where the program code read out of the storage medium may be written into a memory provided for a function expanding board inserted into the computer or a function expanding unit connected to the computer, and after that, a CPU or the like provided for the function expanding board or function expanding unit executes a part or all of actual processings on the basis of instructions of the program code and the functions of the embodiments mentioned above are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-110378, filed May 17, 2011 and Japanese Patent Application No. 2012-051386, filed Mar. 8, 2012 which are hereby incorporated by reference herein in their entirety.

What is claimed is:

1. An image encoding apparatus comprising:
an input unit configured to input a first image data corresponding to one of a left eye image and a right eye image and a second image data corresponding to another of the left eye image and the right eye image;
a detection unit configured to detect a parallax vector of an encoding-subject block of the second image,
wherein the detection unit detects the parallax vector of the encoding-subject block of the second image data by using image data of a search range in a reference picture of the first image data;
an encoding unit configured to obtain prediction image data from the reference picture of the first image data in accordance with the parallax vector detected by the detection unit and encode the encoding-subject block of the second image data by using the prediction image data;
a controlling unit configured to detect a difference value between the image data of the encoding-subject block of the second image data and the image data at a position corresponding to that of the encoding-subject block in the reference picture of the first image data and set the search range in the reference picture of the first image data for detecting the parallax vector by the detection unit in accordance with the detected difference value;
wherein the controlling unit changes a size of the search range in accordance with the difference value, and
wherein the detection unit detects the parallax vector of the encoding-subject block of the second image data by using the image data of the search range, which is set by the controlling unit, in the reference picture of the first image data.

2. An apparatus according to claim 1, wherein when the difference value is larger than a threshold value, the controlling unit sets the size of the search range to a first size, and when the pixel difference value is equal to or less than the threshold value, the controlling unit sets the size of the search range to a second size smaller than the first size.

3. An apparatus according to claim 2, wherein the controlling unit controls the detection unit so that the number of times of search for detecting the parallax vector of the encoding-subject block is a predetermined value irrespective of the size of the search range.

4. An apparatus according to claim 1, wherein when the difference value is larger than a threshold value, the controlling unit controls the detection unit so as to roughly search the set search range, and when the difference value is equal to or less than the threshold value, the controlling unit controls the detection unit so as to finely search the set search range.

5. An image encoding apparatus comprising:
an input unit configured to input a first image data corresponding to one of a left eye image and a right eye image and a second image data corresponding to another of the left eye image and the right eye image;
a detection unit configured to detect a parallax vector of an encoding-subject block of the second image,
wherein the detection unit detects the parallax vector of the encoding-subject block of the second image data by using image data of a search range in a reference picture of the first image data;
an encoding unit configured to obtain prediction image data from the reference picture of the first image data in accordance with the parallax vector detected by the detection unit and encode the encoding-subject block of the second image data by using the prediction image data;
a controlling unit configured to detect a difference value between the image data of the encoding-subject block of the second image data and the image data at a position corresponding to that of the encoding-subject block in the reference picture of the first image data and set the search range in the reference picture of the first image data for detecting the parallax vector by the detection unit in accordance with the detected difference value;
wherein the controlling unit sets the search range at a first position in the reference picture of the first image data if the difference value is equal to or less than a threshold value, and sets the search range at a second position different in a horizontal direction from the first position if the difference value is larger than the threshold value, and
wherein the detection unit detects the parallax vector of the encoding-subject block of the second image data by using the image data of the search range, which is set by the controlling unit, in the reference picture of the first image data.

* * * * *